United States Patent
Suzuki

[11] Patent Number: 5,358,366
[45] Date of Patent: Oct. 25, 1994

[54] SCREW AND THREAD ROLLING DIE

[75] Inventor: Yasuo Suzuki, Saitama, Japan

[73] Assignees: O S G Corporation; Kabushiki Kaisha Suzuki Rashi Seisakusho, both of Japan

[21] Appl. No.: 949,821

[22] PCT Filed: Jul. 12, 1991

[86] PCT No.: PCT/JP91/00939
§ 371 Date: Dec. 18, 1992
§ 102(e) Date: Dec. 18, 1992

[87] PCT Pub. No.: WO92/01165
PCT Pub. Date: Jan. 23, 1992

[30] Foreign Application Priority Data
Jul. 13, 1990 [JP] Japan .................. 2-183888
Sep. 18, 1990 [JP] Japan .................. 2-246203

[51] Int. Cl.⁵ .............. F16B 35/04; F16B 39/30; B29D 17/00
[52] U.S. Cl. .................. 411/311; 411/412; 72/469
[58] Field of Search ......... 411/180, 301, 308–311, 411/412, 413, 424; 72/414, 469, 470

[56] References Cited
U.S. PATENT DOCUMENTS
2,908,309 10/1959 Brill ..................... 411/301
3,818,749 6/1974 Yankee et al. .............. 411/308 X
5,133,630 7/1992 Hughes .................. 411/311 X
5,273,383 12/1993 Hughes .................. 411/180 X Primary Examiner—Neill R. Wilson
Attorney, Agent, or Firm—Lowe, Price, LeBlanc & Becker

[57] ABSTRACT

A screw having a main thread (2) to be screwed in and a sub-thread (3) formed in the direction opposite to the main thread, which is characterized in that a slant surface (3b) of the sub-thread on the screw-loosening side has a sharp slope whereas that (3a) on the screw-tightening side has a gentler slope.

When such a tapping screw as above is screwed into a pre-drilled hole (4) and the sub-thread (3) advances in the direction opposite to the screwing-in direction thereof while acting like a wedge because the slope of the slant surface (3a) on the screw-in side is gentler.

When the screw is subject to torque in the screw-loosening direction after tightened, the torque acts on the sub-thread (3) in the tightening direction thereof and, because of the sharp slope of the slant surface (3b) on the screw-loosening side, the sub-thread resists the unscrewing of the screw as if eating into the surface of the pre-drilled hole and prevents the screw from loosening.

3 Claims, 4 Drawing Sheets

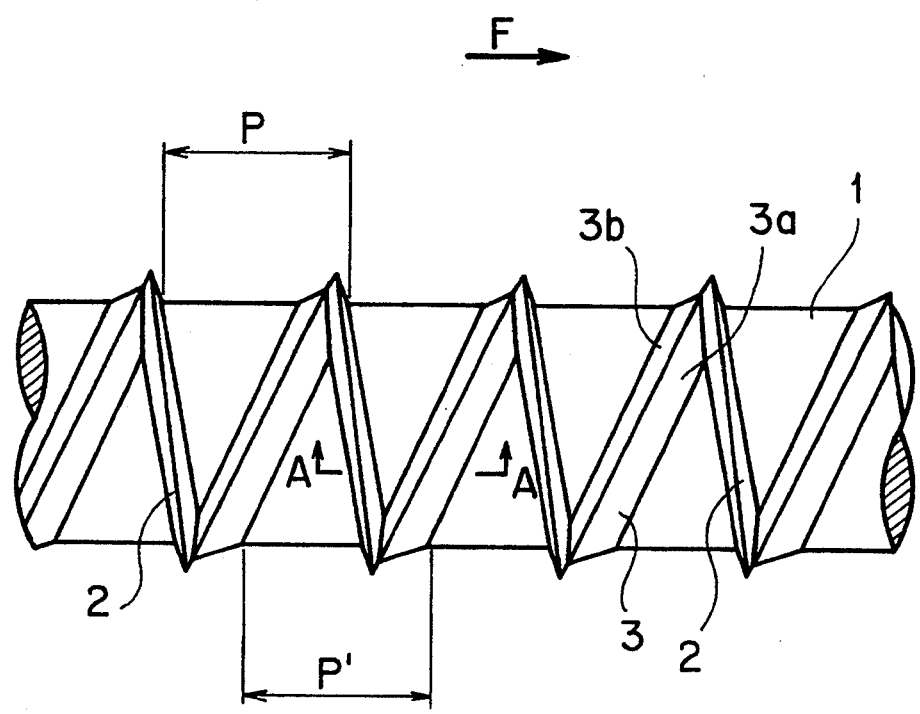
F I G. 1

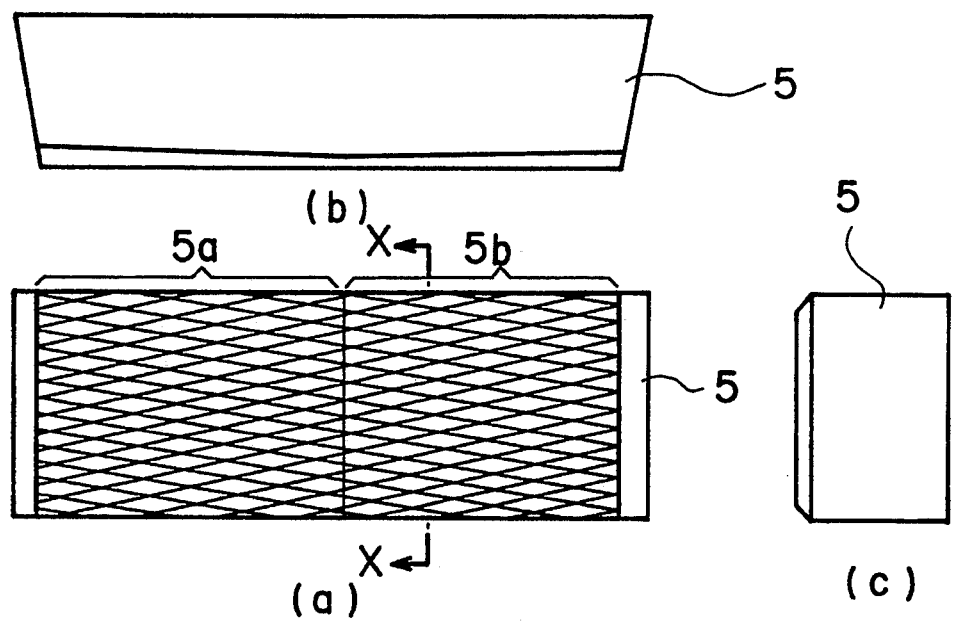
F I G. 4
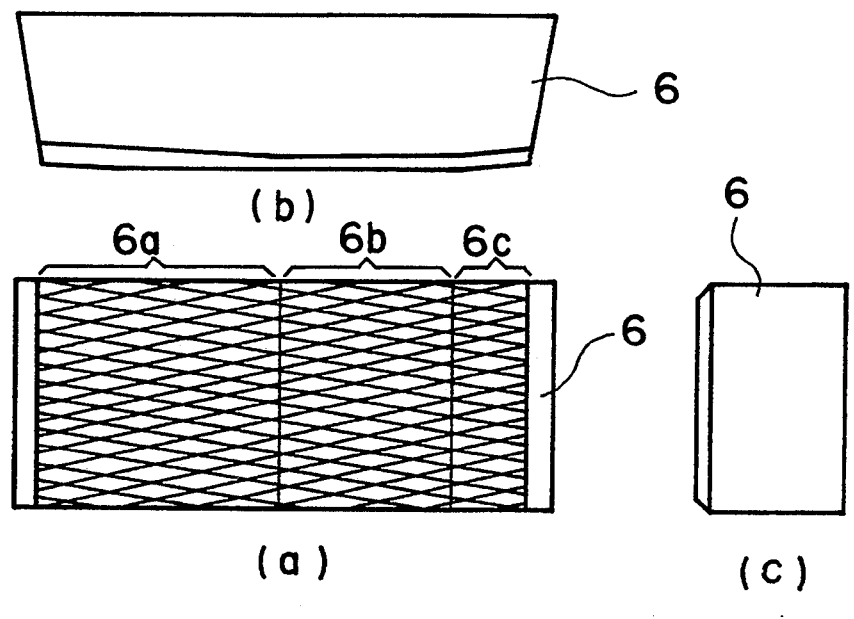
F I G. 5

SCREW AND THREAD ROLLING DIE

TECHNICAL FIELD

The present invention relates to a fastening screw, and more particularly to a fastening screw for preventing loosening thereof after tightened and having a locking function, and a thread rolling die for forming such screw.

BACKGROUND OF THE INVENTION

A fastening screw is used in a variety of industrial fields since it can be used for connecting a plurality of members with ease. Particularly, a tapping screw immediately fastens steel plates or synthetic resin material only with forming a pre-drilled hole and without forming an internal thread to the material. That is, no tapping operation or tool like a screw tap is required to form the thread. Therefore, the tapping screw is widely used in manufacturing household electric appliances, automobiles and the like.

Meanwhile, in this kind of screw, generally, torque for loosening the screw is small and the screw is susceptible to inverse rotation or loosening due to vibration after tightened.

To solve the problem, a spring washer, double nuts or the like are applied when bolts and nuts are used. Further, when the tapping screw is adapted, a locking washer or bonding agent is preferably adapted.

However, with the conventional countermeasures described above, separate parts from the screw such as spring washers, another nut, other washers, and bonding agents are required, which increases costs and manhour for fastening work. Moreover, when the tapping screw is used, plastic deformation of an internal thread material loosens the screw even though the screw does not rotate. Therefore, with only the above method, the loosening can not be prevented securely, which provides another problem in this respect.

The present invention has been accomplished to eliminate the above drawbacks and the object thereof is to provide a screw, and a thread rolling die for manufacturing the screw.

DISCLOSURE OF THE INVENTION

To accomplish the object described above, the screw according to the present invention adopts a main thread to be screwed in; and a sub-thread formed in the direction opposite to the main thread, the sub-thread having an external diameter smaller than that of the main thread and larger than a diameter of a pre-drilled hole of a mating member, and a slant surface of said sub-thread on a screw-loosening side has a sharp slope and that on a screw-tightening side has a gentle slope.

In the above structure, the external diameter of the sub-thread may be substantially the same as the diameter of the pre-drilled hole.

A nut according to the present invention is used for the above screw and no internal thread is formed in the pre-drilled hole of the nut.

Further, the thread rolling die according to the present invention has a structure in which a thread groove for a main thread and that of a sub-thread are formed, and the thread groove for the sub thread formed in the direction opposite to the thread groove for the main thread and shallower than that of the main thread, and a slant surface of the thread groove for the sub-thread on a screw-loosening side has a sharp slope and that on a screw-tightening side has a gentle slope.

The present invention with the above structure works as described below.

When tightened, the screw screws in by the main thread having a larger diameter. The sub-thread is formed in the direction opposite to the main thread and has an external diameter smaller than that of the main thread and larger than the diameter of the pre-drilled hole and the inclination of the slant surface of the sub-thread is gentler on the tightening side, which permits the screw to advance in the direction opposite to the sub-thread.

When the screw is subject to a torque in the loosening direction after tightened, the torque works to tighten the sub-thread. Moreover, since the slant surface of the thread is steep, the sub-thread resists the return of the screw as if the sub-thread eats into the pre-drilled hole, which prevents the screw from being loosened.

If fastened material, to which the pre-drilled hole is formed, is provided with toughness, inner wall of the pre-drilled hole expands inwardly due to plastic deformation in accordance with the screwing-in of the main thread and the inner diameter of the hole becomes small. As a result, even if the diameter of the sub-thread before screwed-in is almost the same as that of the pre-drilled hole, the sub-thread eats into the pre-drilled hole, which prevents the screw from being loosened as described above.

BRIEF DESCRIPTION OF THE DRAWING

FIG. 1 is a view of a screw according to the present invention;

FIG. 4 shows a moving side flat die of a thread rolling die according to the present invention, in which (a) is a front view, (b) a plan view, and (c) a side view;

FIG. 5 shows a fixed side flat die of the thread rolling die, in which (a) is a front view, (b) a plan view, and (c) a side view;

PREFERRED EMBODIMENTS OF THE PRESENT INVENTION

Figure 2:
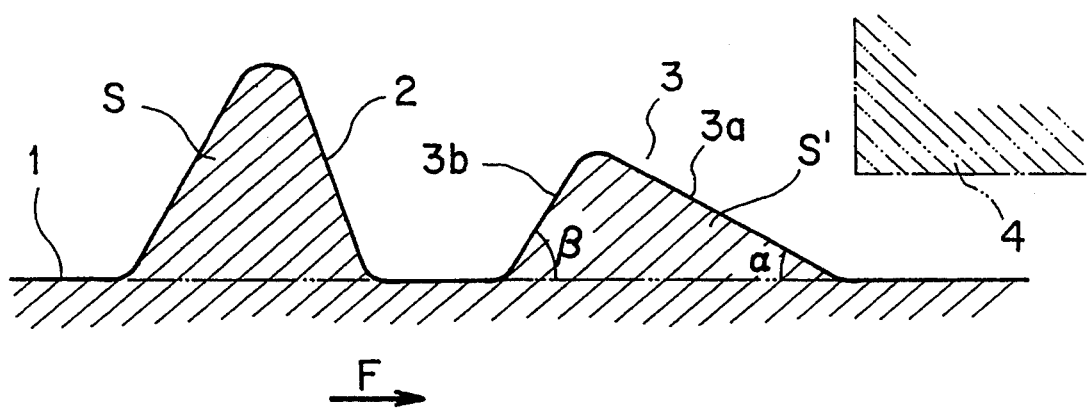
FIG. 2 is a view taken along the line A—A of FIG. 1.
Figure 3:
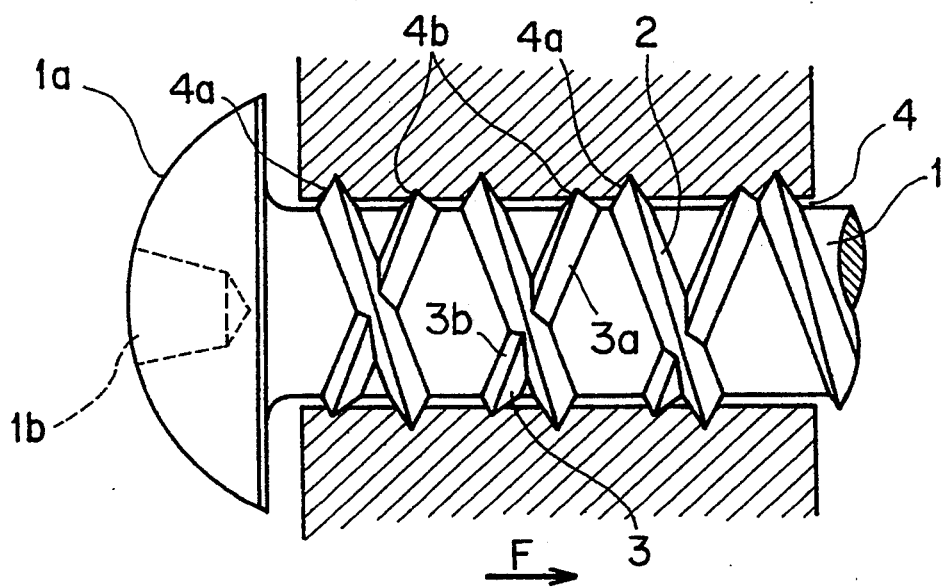
FIG. 3 is a cross-sectional view showing the condition in which the screw according to the present invention is screwed in a pre-drilled hole.

One embodiment of the present invention will be explained below on tapping screws with reference to drawings. As illustrated in FIGS. 1 to 3, the tapping screw according to the present invention is provided with a shaft 1 on which a main thread 2 is formed to provide a fastening function, which has the same function as an ordinary thread, and a sub-thread 3 is formed in the direction opposite to the main thread, in other words, when the main thread 2 is formed as a right-handed thread, the sub-thread 3 is formed as a left-handed thread. The external diameter of the main thread 2 is larger than that of the sub-thread 3 and the external diameter of the sub-thread 3 is slightly larger than a diameter of the pre-drilled hole 4. Further, when the screws are formed by rolling, if the main thread 2 and the sub-thread 3 have the same pitches, the cross-sectional area S of the main thread 2 is preferably the same as the cross-sectional area S' of the sub thread 3. Then, it is important that the inclination $\alpha$ of a slant surface 3a of the sub-thread 3 on the screw-tightening side with regard to a screwing-in direction of the main thread 2 as indicted by an arrow F is smaller than the inclination $\beta$ of a slant surface 3b of the sub-thread 3 on the screw-loosening side.

On screwing the tapping screw into the pre-drilled hole 4, the main thread 2 advances while forming an internal thread 4a like an ordinary tapping screw.

On the other hand, the sub-thread 3 has a diameter slightly larger than that of the pre-drilled hole 4 and the slant surface 3a on the screw-in side is gentler. Therefore, the sub-thread 3 advances in accordance with the advance of the main thread 2 in the pre-drilled hole 4 in the direction opposite to a screw-tightening direction of the sub-thread itself while acting like a wedge to form a resistance groove 4b shallower than the internal thread 4a. The action of the above slant surface 3a permits the screw to be cramped with the same fastening torque as an ordinary tapping screw.

If fastened material, to which the pre-drilled hole is formed, is provided with toughness, inner wall of the pre-drilled hole expands inwardly due to plastic deformation in accordance with the screwing-in of the main thread and the inner diameter of the hole becomes small. As a result, even if the diameter of the sub-thread before screwed-in is almost the same as that of the pre-drilled hole or the external diameter of the sub-thread 3 is slightly smaller than the diameter of the pre-drilled hole, the sub-thread eats into the pre-drilled hole to form the resistance groove 4b, which prevents the screw from being loosened as described above.

Even though the tapping screw is subject to a force due to vibration or the like and the plastic deformation of the internal thread material loosens the screw even though the screw does not rotate, since the screwing-in direction of the sub-thread 3 is opposite to that of the main thread 2, a loosening torque applied to the main thread works as a fastening torque to the sub-thread 3, which allows the screw to resist the rotation in the loosening direction. Further, when the screw is about to loosen due to the plastic deformation arid to be slipped off, the slant surface 3b of the sub-thread on the screw-loosening side eats into the surface of the resistance groove 4b of the pre-drilled hole 4 to prevent the loosening.

The screw must be loosened when the equipment is overhauled. In such a case, into a groove 1b of a screw head 1a is inserted a screwdriver to rotate the screw with a torque larger than the resistance of the steeply slant surface 3b, allowing the screw to be removed. This torque is adjusted to be almost the same as the fastening torque by designing the shape of the sub-thread 3 in accordance with the internal thread material.

The torque on the loosening side is increased regardless of the position of the screw and even fastening the screw is stopped midway, the screw will not be loosened with ease.

Another problem about the use of the tapping screw is that the internal thread formed on the pre-drilled hole side is apt to be broken, that is, the thread is apt to fail to function. On the other hand, in the tapping screw according to the present invention, when the screw is fastened, the sub-thread 3 advances and the slant surface 3a thereof pushes the groove of the internal thread 4a to narrow the groove, which increases the breaking strength of the internal thread 4a. As a result, the internal thread is less susceptible to malfunction and the thread is used more repeatedly.

In this case, the head of the sub-thread 3 is preferably formed to be rounded as illustrated in FIG. 3, to minimize the damage of the pre-drilled hole, which further increases the number of the repeat use.

The slant surface of the thread is more preferable with flat face than with curved face to function as a wedge and to prevent deflection, but, the surface may be curved if the above function is maintained.

The structure of the screw is not limited to the tapping screw but is to be applied widely to other fastening screws. Particularly, it is remarkably effective to apply the above structure to the tapping screw which is used for a synthetic resin material.

In the embodiment shown in FIG. 1, the pitches of the main thread 2 and the sub-thread 3 are the same. In this case, intersections of the right-handed and left-handed threads are aligned on the shaft of the screw in the same direction. As a result, axially projected shape of the screw shaft is apt to be an ellipse or an egg-shape. Therefore, to prevent the problem, in the embodiment shown in FIG. 3, the ratio of the pitches of the right- and left-handed threads is determined so as not to be an integer. As a result, the intersections of the right- and left-handed threads are aligned not in parallel with the axis of the screw and the axially projected shape of the screw becomes a round shape. In such a case, it is more effective to design the pitch of the sub-thread 3 larger than that of the main thread 2 since the sub-thread 3 advances more easily while working as a wedge.

As clearly explained above, the number of threads of the main thread and the sub-thread can be determined freely. Further, the lateral cross section of the shaft 1 of the screw according to the present invention is not limited to a round but the screw may be applied to un-round cross section such as rectangular and triangular cross sections.

FIGS. 4 and 5 show a flat rolling die for manufacturing the tapping screw described above. FIG. 4 shows a moving side flat die 5, on which right- and left-handed thread grooves are formed in such a manner as to cross each other. The thread grooves are provided with eating portions 5 at the left side of the die 5 and parallel portions 5b for forming the external diameter of the thread at a prescribed value.

FIG. 5 shows a fixed side flat die 6 in which relief portions 6c are formed on a finishing side besides eating portions 6a and parallel portions 6b in the same manner as the moving die.

Figure 6:
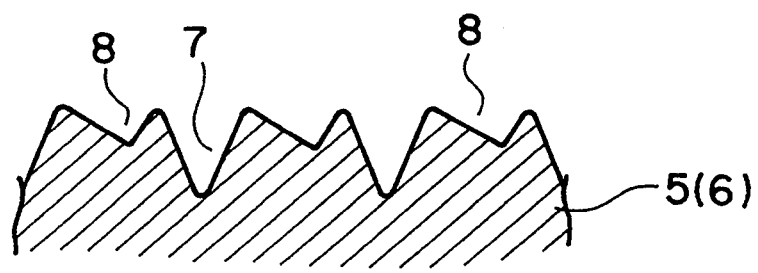
FIG. 6 shows a cross-sectional view taken along the line X—X of FIG. 4 in which pitches of a main thread and a sub-thread are the same.

FIG. 6 shows a cross-sectional view of the above Flat die. A thread groove 7 of the main thread is formed deeper and a thread groove 8 of the sub-thread shallower. The external diameter of the sub-thread is made smaller than that of the main thread. Further, the inclination of the thread grooves 8 of the sub-thread is sharper on the screw-loosening side and gentler on the screw-tightening side. In case that the main thread and the sub-thread have the same pitches, the distances between the thread grooves 7 of the main thread 2 and the thread grooves 8 of the sub-thread 3 are always the same.

These fixed side and moving side dies 5 and 6 are opposed to each other with the eating portions 5a and 6a being opposite to each other and material for the thread not shown is put between the dies and rolled to form right- and left-handed threads according to the present invention.

Figure 7:
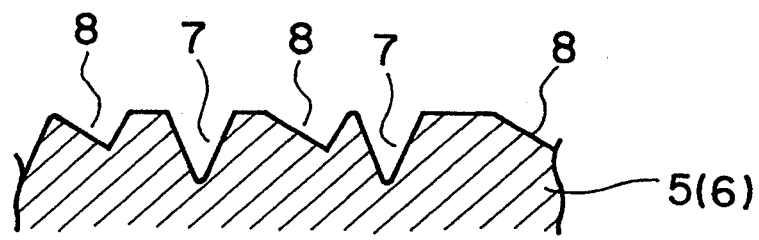
FIG. 7 shows the cross-sectional view taken along the line X—X of FIG. 4 in which the pitches of the main thread and the sub-thread are different from each other.

FIG. 7 shows a cross section where the ratio of the pitches of the main and sub-threads is designed so as not to be an integer. The distances between the thread grooves 7 of the main thread 2 and the thread grooves 8 of the sub-thread 3 are slightly different from each other for every pitch to cause the material for the thread to be rolled smoothly at the rolling, which provides highly accurate rolling with ease.

Figure 8:
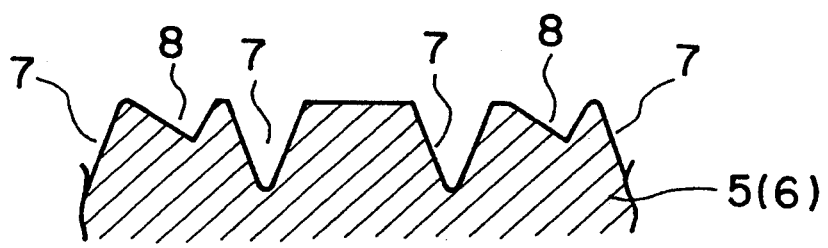
FIG. 8 shows the cross-sectional view taken along the line X—X of FIG. 4 in which the pitch of the sub-thread is twice larger than that of the main thread.

FIG. 8 shows an embodiment in which one thread groove 8 of the sub-thread is formed every third thread groove 7 of the main thread. The pitch of the sub-thread 3 is twice larger than that of the main thread 2, for example, the main thread is a double-start thread and the sub-thread a single-start thread.

It is obvious that the structure of the rolling die may be applied to a roller die, a fan-shaped die or the like as well as the flat die.

As described above, with the screw according to the present invention, the loosening of the screw after tightened can be effectively prevented without additional parts, even though the tightening operation is stopped midway. In addition, the breaking strength of the internal thread is increased, which increases the number of the repeat use of the internal thread.

Further, the rolling dies are easily manufactured since only shallower thread grooves are formed on conventional dies in the opposite direction.

POSSIBILITY OF THE INDUSTRIAL APPLICATION

The screw according to the present invention is applicable mainly as a tapping screw to a variety of industrial field as well as automobile industry and household electrical appliances industry.

I claim:

1. A screw comprising: a head portion formed at an end of said screw, said head portion having engaging means for engaging said head portion with a rotating driver; a main clockwise/counterclockwise thread to be screwed in; and a counterclockwise/clockwise sub-thread formed in the direction opposite to the main thread; said sub-thread having an external diameter smaller than that of the main thread and larger than a diameter of a pre-drilled hole of a mating member, characterized in that a slant surface of said sub-thread on a screw-loosening side has a sharp slope and that on a screw-tightening side has a gentle slope.

2. A screw as claimed in claim 1, wherein said external diameter of the sub-thread is substantially the same as said diameter of the pre-drilled hole.

3. A flat thread rolling die characterized in that: a clockwise/counterclockwise thread groove for a main thread and a counterclockwise/clockwise thread groove for a sub-thread are formed, said thread groove for the sub-thread formed in the direction opposite to the thread groove for the main thread and being shallower than that of the main thread, a slant surface of said thread groove for the sub-thread on a screw-loosening side has a sharp slope and that on a screw-tightening side has a gentle slope.

* * * * *

REEXAMINATION CERTIFICATE (2973rd)
United States Patent [19]
Suzuki

[11] B1 5,358,366
[45] Certificate Issued Aug. 13, 1996

[54] SCREW AND THREAD ROLLING DIE

[75] Inventor: Yasuo Suzuki, Saitama, Japan

[73] Assignees: Kabushiki Kaisha Suzuki Rashi Seisakusho, Asaki; OSG Corp., Toyokawa, both of Japan

Reexamination Request:
No. 90/003,819, May 3, 1995

Reexamination Certificate for:
Patent No.: 5,358,366
Issued: Oct. 25, 1994
Appl. No.: 949,821
Filed: Jul. 12, 1991

[22] PCT Filed: Jul. 12, 1991
[86] PCT No.: PCT/JP91/00939
§ 371 Date: Dec. 18, 1992
§ 102(e) Date: Dec. 18, 1992
[87] PCT Pub. No.: WO92/01165
PCT Pub. Date: Jan. 23, 1992

[30] Foreign Application Priority Data
Jul. 13, 1990 [JP] Japan ............................ 2-183888
Sep. 18, 1990 [JP] Japan ............................ 2-246203

[51] Int. Cl.$^6$ .................... F16B 35/04; F16B 39/30; B21D 17/00
[52] U.S. Cl. .................... 411/311; 411/412; 72/469
[58] Field of Search ...................... 411/180, 301, 411/308–311, 412, 413, 424; 72/414, 469, 470

[56] References Cited

U.S. PATENT DOCUMENTS

| | | |
|---|---|---|
| 2,908,309 | 10/1959 | Brill . |
| 3,818,749 | 6/1974 | Yankee et al. . |
| 5,133,630 | 7/1992 | Hughes . |
| 5,273,383 | 12/1993 | Hughes . |

FOREIGN PATENT DOCUMENTS 1-216110  8/1989  Japan .

*Primary Examiner*—Neill R. Wilson

[57] ABSTRACT

A screw having a main thread (2) to be screwed in and a sub-thread (3) formed in the direction opposite to the main thread, which is characterized in that a slant surface (3b) of the sub-thread on the screw-loosening side has a sharp slope whereas that (3a) on the screw-tightening side has a gentler slope.

When such a tapping screw as above is screwed into a pre-drilled hole (4) and the sub-thread (3) advances in the direction opposite to the screwing-in direction thereof while acting like a wedge because the slope of the slant surface (3a) on the screw-in side is gentler.

When the screw is subject to torque in the screw-loosening direction after tightened, the torque acts on the sub-thread (3) in the tightening direction thereof and, because of the sharp slope of the slant surface (3b) on the screw-loosening side, the sub-thread resists the unscrewing of the screw as if eating into the surface of the pre-drilled hole and prevents the screw from loosening.

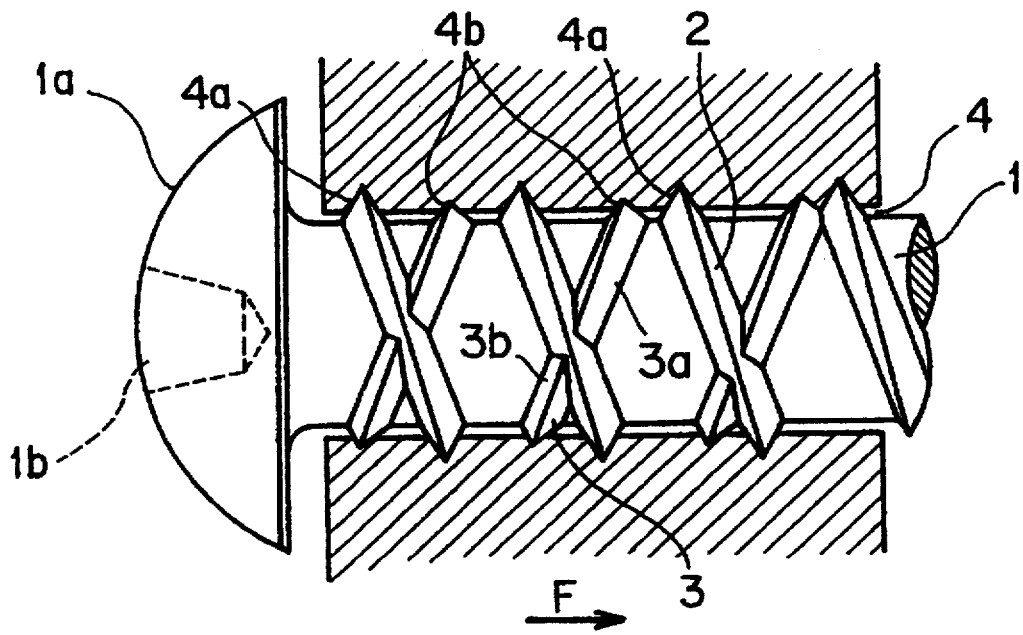

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 53 to 60:

The screw must be loosened when the equipment is overhauled. In such a case, into [a] *the engaging and rotating means or* groove 1b of [a] *the* screw head 1a is inserted a screwdriver to rotate the screw with a torque larger than the resistance of the steeply slant surface 3b, allowing the screw to be removed. This torque is adjusted to be almost the same as the fastening torque by designing the shape of the sub-thread 3 in accordance with the internal thread material.

AS A RESULT OF REEXAMINATION, IT HAS BEEN DETERMINED THAT:

The patentability of claim 3 is confirmed.

Claims 1 and 2 are determined to be patentable as amended.

1. A *repeatedly usable* screw comprising:

a head portion formed at an end of said screw, said head portion having engaging means for engaging said head portion with a rotating driver;

a main clockwise/counterclockwise thread to be screwed in; and a counterclockwise/clockwise sub-thread formed in the direction opposite to the main thread;

said sub-thread having an external diameter smaller than that of the main thread and *adapted to be* larger than a diameter of a pre-drilled hole of a mating member[,];

characterized in that a slant surface of said sub-thread on a screw-loosening side has a sharp slope and that on a screw-tightening side has a gentle slope; *and a ratio of the pitches of the main and sub-thread is designated so as not to be an integer.*

2. A screw [as claimed in claim 1, wherein said external diameter of the sub-thread is substantially the same as said diameter of the pre-drilled hole] *comprising:*

*a head portion formed at an end of said screw, said head portion having engaging and rotating means for engaging said head portion with a rotating driver while allowing the driver to impart rotation to the head portion;*

*a main clockwise/counterclockwise thread to be screwed in;*

*and a counterclockwise/clockwise sub-thread formed in the direction opposite to the main thread;*

*said sub-thread having an external diameter smaller than that of the main thread and adapted to be larger than a diameter of a pre-drilled hole of a mating member, characterized in that a slant surface of said sub-thread on a screw-loosening side has a sharp slope and that on a screw-tightening side has a gentle slope.*

\* \* \* \* \*